United States Patent
Raj et al.

(10) Patent No.: US 12,549,595 B2
(45) Date of Patent: Feb. 10, 2026

(54) USING PACKET FINGERPRINTING AT AN ENDPOINT TO DETECT MALWARE

(71) Applicant: Cisco Technology, Inc., San Jose, CA (US)

(72) Inventors: Apoorv Raj, Bangalore (IN); Durairaj Murugasamy, Bangalore (IN); Paritosh Sinha, Bihar (IN); Vinay Singh, Ranchi (IN); George Mathew Koikara, Bangalore (IN); David Arthur McGrew, Poolesville, MD (US); Sivakrishna Lingareddy, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 94 days.

(21) Appl. No.: 18/413,801

(22) Filed: Jan. 16, 2024

(65) Prior Publication Data

US 2025/0233885 A1    Jul. 17, 2025

(51) Int. Cl.
*H04L 29/06* (2006.01)
*H04L 9/40* (2022.01)

(52) U.S. Cl.
CPC ........ *H04L 63/145* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 10,382,479 B2 * | 8/2019 | Adams | H04L 63/145 |
| 10,523,609 B1 * | 12/2019 | Subramanian | H04L 51/08 |
| 11,140,196 B1 | 10/2021 | Bilge et al. | |
| 11,240,262 B1 | 2/2022 | Aziz et al. | |
| 11,888,870 B2 * | 1/2024 | Garyani | G06F 21/554 |
| 12,166,793 B2 * | 12/2024 | Jain | H04L 63/1416 |
| 12,218,968 B1 * | 2/2025 | Harb | H04L 63/145 |

(Continued)

OTHER PUBLICATIONS

Kim, Hyundo et al. Revisiting TLS-Encrypted Traffic Fingerprinting Methods for Malware Family Classification. 2022 13th International Conference on Information and Communication Technology Convergence (ICTC). https://ieeexplore.ieee.org/stamp/stamp.jsp?tp=&arnumber=9952872 (Year: 2022).*

(Continued)

*Primary Examiner* — Jeremiah L Avery
(74) *Attorney, Agent, or Firm* — Polsinelli P.C.

(57) ABSTRACT

Aspects of the present disclosure are directed to on-device firewall and library agents integrated with secure agents on network connected endpoints. The on-device firewall and library agents enable inline analysis and inspection of data packets using protocol fingerprints generated for the data packets using an on-device malware detection engine. In one aspect, a network device includes a driver configured to capture a plurality of data packets received at the network device; and an on-device malware detection engine configured to receive at least a subset of the plurality of packets, and generate a fingerprint for the subset of the plurality of packets, the fingerprint being indicative of whether the plurality of data packets are associated with an external malware communication.

20 Claims, 5 Drawing Sheets

(56) References Cited

U.S. PATENT DOCUMENTS

| | | | |
|---|---|---|---|
| 12,425,416 B2* | 9/2025 | Ahmed | G06N 20/00 |
| 2017/0223046 A1* | 8/2017 | Singh | H04L 63/1491 |
| 2017/0289176 A1* | 10/2017 | Chen | H04L 63/1408 |
| 2018/0063199 A1* | 3/2018 | Lara | H04L 63/1458 |
| 2019/0020664 A1* | 1/2019 | Wood | H04L 63/0236 |
| 2019/0109820 A1* | 4/2019 | Clark | H04L 9/0861 |
| 2019/0109822 A1* | 4/2019 | Clark | H04L 63/145 |
| 2020/0125721 A1* | 4/2020 | Antony | H04L 63/0209 |
| 2021/0243208 A1* | 8/2021 | Rubin | G06F 21/554 |
| 2021/0288981 A1* | 9/2021 | Numainville | H04L 63/1416 |
| 2021/0377283 A1 | 12/2021 | Anderson et al. | |
| 2022/0014554 A1* | 1/2022 | Vasu | H04L 63/1441 |
| 2022/0224716 A1 | 7/2022 | Salji | |
| 2023/0129786 A1 | 4/2023 | Anderson et al. | |
| 2024/0163261 A1* | 5/2024 | Crabtree | H04L 63/0815 |
| 2024/0205240 A1* | 6/2024 | Duan | H04L 63/1466 |
| 2024/0259397 A1* | 8/2024 | Li | G06F 18/2415 |
| 2024/0314141 A1* | 9/2024 | Nanivadekar | H04L 63/1416 |
| 2024/0396913 A1* | 11/2024 | Shah | H04L 41/16 |
| 2025/0039193 A1* | 1/2025 | Jia | H04L 63/1425 |
| 2025/0039196 A1* | 1/2025 | Crabtree | G06F 21/6218 |
| 2025/0071139 A1* | 2/2025 | Sethi | H04L 63/1416 |
| 2025/0071142 A1* | 2/2025 | Sethi | H04L 63/1458 |
| 2025/0088521 A1* | 3/2025 | Rahman | H04L 63/1441 |
| 2025/0106185 A1* | 3/2025 | Ieong | H04L 63/1416 |
| 2025/0193240 A1* | 6/2025 | Bishop | H04L 63/20 |
| 2025/0193241 A1* | 6/2025 | Bishop | H04L 41/16 |

OTHER PUBLICATIONS

Tyagi, Rohit et al. Packet Inspection for Unauthorized OS Detection in Enterprises. IEEE Security and Privacy, vol. 13, Issue: 4. https://ieeexplore.ieee.org/stamp/stamp.jsp?tp=&arnumber=7180275 (Year: 2015).*

Thom, Jay et al. Smart Recon: Network Traffic Fingerprinting for IoT Device Identification. 2022 IEEE 12th Annual Computing and Communication Workshop and Conference (CCWC). https://ieeexplore.ieee.org/stamp/stamp.jsp?tp=&arnumber=9720739 (Year: 2022).*

Yao, Le et al. Intelligent Device Identification Method Based on Network Packet Fingerprint. 2021 IEEE Sixth International Conference on Data Science in Cyberspace (DSC). https://ieeexplore.ieee.org/stamp/stamp.jsp?tp=&arnumber=9750483 (Year: 2021).*

* cited by examiner

USING PACKET FINGERPRINTING AT AN ENDPOINT TO DETECT MALWARE

TECHNICAL FIELD

The present disclosure relates to communication systems, and in particular, to on-device firewall and library agents integrated with secure agents on network connected endpoints for inline analysis and inspection of data packets using protocol fingerprints generated for the data packets using an on-device malware detection engine.

BACKGROUND

Endpoints (e.g., laptops, mobile devices, desktops, IoTs, etc.) connected to a network are vulnerable to malwares and bots. To address this vulnerability, host-based firewalls have been utilized to prevent such attacks in devices that are connected to an organizations' network (e.g., connected to an enterprise network). Furthermore, there is a lack of effective visibility and control over direct-to-internet traffic. These vulnerabilities expose endpoints, software running thereon, and/or network to which they are connected to malwares, Dynamic Link Library (DLL) hijacking, etc.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
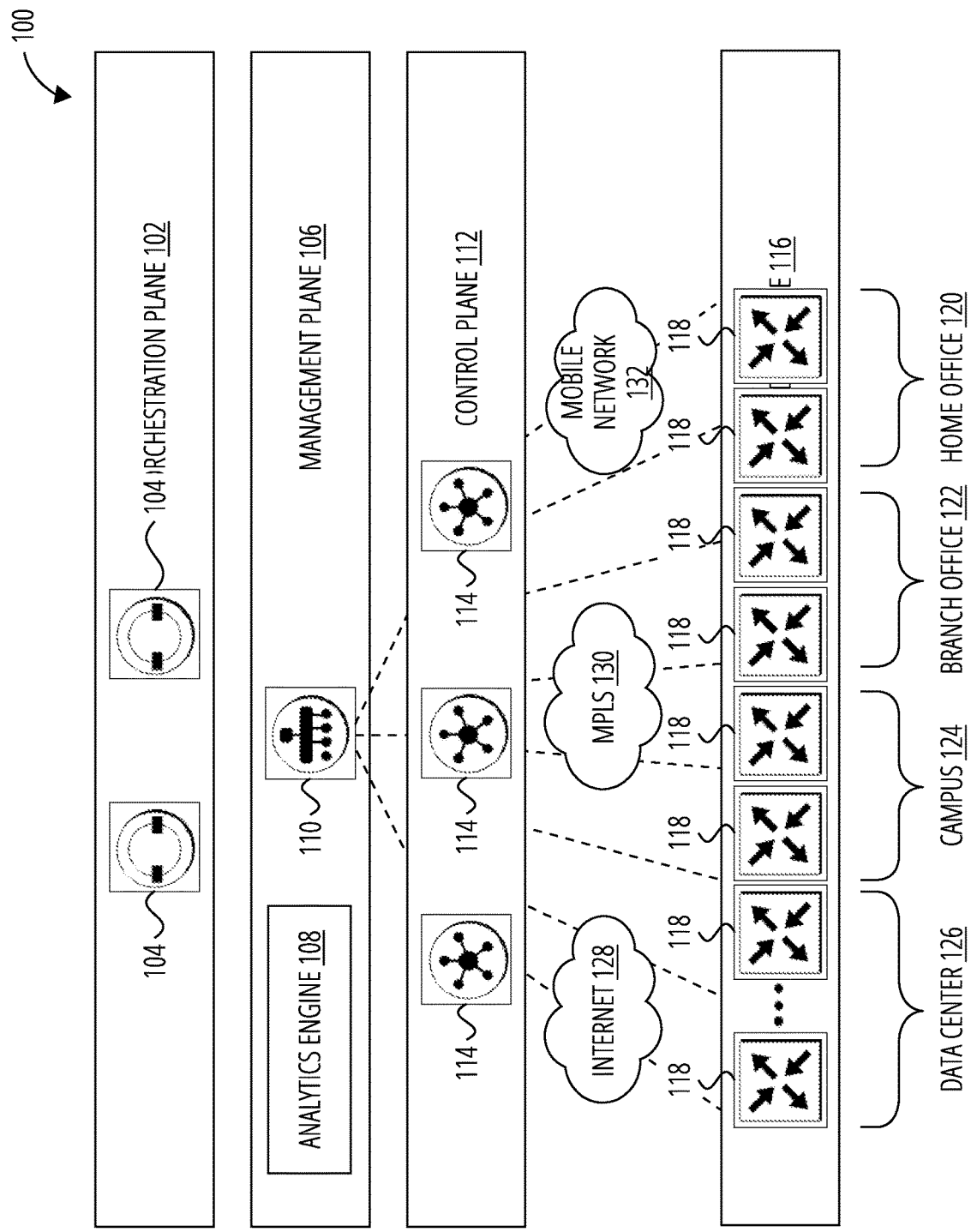
FIG. 1 illustrates an example of a network architecture 100 for implementing aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Aspects of the present disclosure are directed to on-device firewall and library agents integrated with secure agents on network connected endpoints. The on-device firewall and library agents enable inline analysis and inspection of data packets using protocol fingerprints generated for the data packets using an on-device malware detection engine. As will be described below, such library agent can utilize Artificial Intelligence (AI) and Machine Learning (ML) models to identify possible malicious software and/or otherwise unauthorized processes based on examination of intercepted network traffic. The library agent may then utilize the output of such AI/ML models to provide protocol fingerprinting and metadata indicative of whether intercepted network traffic are malicious (unauthorized) or authorized.

Techniques described herein provide an inline analysis of network sessions that can provide on-the-go and real-time analysis and detection of malwares and disrupt their intrusion into a network and its connected endpoints.

In one aspect, a network device includes a driver configured to capture a plurality of data packets received at the network device; and an on-device malware detection engine configured to receive at least a subset of the plurality of packets, and generate a fingerprint for the subset of the plurality of packets, the fingerprint being indicative of whether the plurality of data packets are associated with an external malware communication.

In another aspect, the on-device malware detection engine is configured to generate the fingerprint inline with reception and processing of the plurality of packets at the network device.

In another aspect, the network device further comprises a firewall agent on the network device configured to determine whether to drop the plurality of packets or permit the plurality of packets to pass through, based on the fingerprint.

In another aspect, the on-device malware detection engine is configured to generate the fingerprint using a malware detection database.

In another aspect, the malware detection database is generated using a machine learning engine.

In another aspect, the machine learning engine is cloud-based and is trained using metadata of previously examined data packets for which the on-device malware detection engine has generated fingerprints.

In another aspect, network device further comprises a connection agent configured to provide secure network access to the network device, and the driver and the on-device malware detection engine are software modules within the connection agent.

In another aspect, the network device is an endpoint terminal connected to a network using the connection agent.

In one aspect, one or more non-transitory computer-readable media include computer-readable instructions, which when executed by one or more processors of a network device, cause the network device to capture a plurality of data packets received at the network device; receive at least a subset of the plurality of packets, and generate a fingerprint for the subset of the plurality of packets, the fingerprint being indicative of whether the plurality of data packets are associated with an external malware communication.

In one aspect, a method for on-device inspection of network traffic includes capturing a plurality of data packets received at the network device; using an on-device malware detection engine, processing a subset of the plurality of packets, and generating a fingerprint for the subset of the plurality of packets, the fingerprint being indicative of whether the plurality of data packets are associated with an external malware communication.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include an analytics engine 108 and one or more physical or virtual network management appliances 110. In some embodiments, the network management appliances 110 can provide centralized management of the network based on results of analyses performed by analytics engines 108 and via a graphical user interface to enable a user to monitor, configure, and maintain the edge network devices 118 and links (e.g., internet transport network 128, MPLS network 130, 4G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively or in addition, the network management appliances 110 can be a dedicated network management system for a single entity. In some embodiments, physical or virtual Cisco® SD-WAN vManage appliances can operate as the network management appliances 110.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 118.

As noted above, endpoints (e.g., laptops, mobile devices, desktops, IoTs, etc., at any one or more of home office network 120, branch office network 122, campus network 124, and/or data center 126 of FIG. 1) connected to a network (e.g., enterprise network architectures 100) are vulnerable to malwares and bots. There is no visibility into the endpoints and/or software running thereon, making them susceptible to DLL hijacking, malicious process or plugin insertions (e.g., a malicious browser plugin), etc. Furthermore, direct-to-Internet traffic lacks effective visibility and controls. Moreover, existing Network Visibility Modules (NVMs) are blind to virtual machine processes. Existing VPN connection agents/secure client (e.g., Cisco's AnyConnect) does not have inline malware detection and blocking capabilities.

To address these shortcomings, aspects of the present disclosure are directed to including an on-device firewall and library agents on endpoints and integrated with secure agents on the endpoints to detect malware communication through inline analysis, protocol fingerprinting, and metadata extraction. As will be described below, such library agent can utilize Artificial Intelligence (AI) and Machine Learning (ML) models to identify possible malicious software and/or otherwise unauthorized processes based on examination of intercepted network traffic. The library agent may then utilize the output of such AI/ML models to provide protocol fingerprinting and metadata indicative of whether intercepted network traffic are malicious (unauthorized) or authorized.

Techniques described herein provide an inline analysis of network sessions that can provide on-the-go and real-time analysis and detection of malwares and disrupt their intrusion into a network and its connected endpoints.

Figure 2:
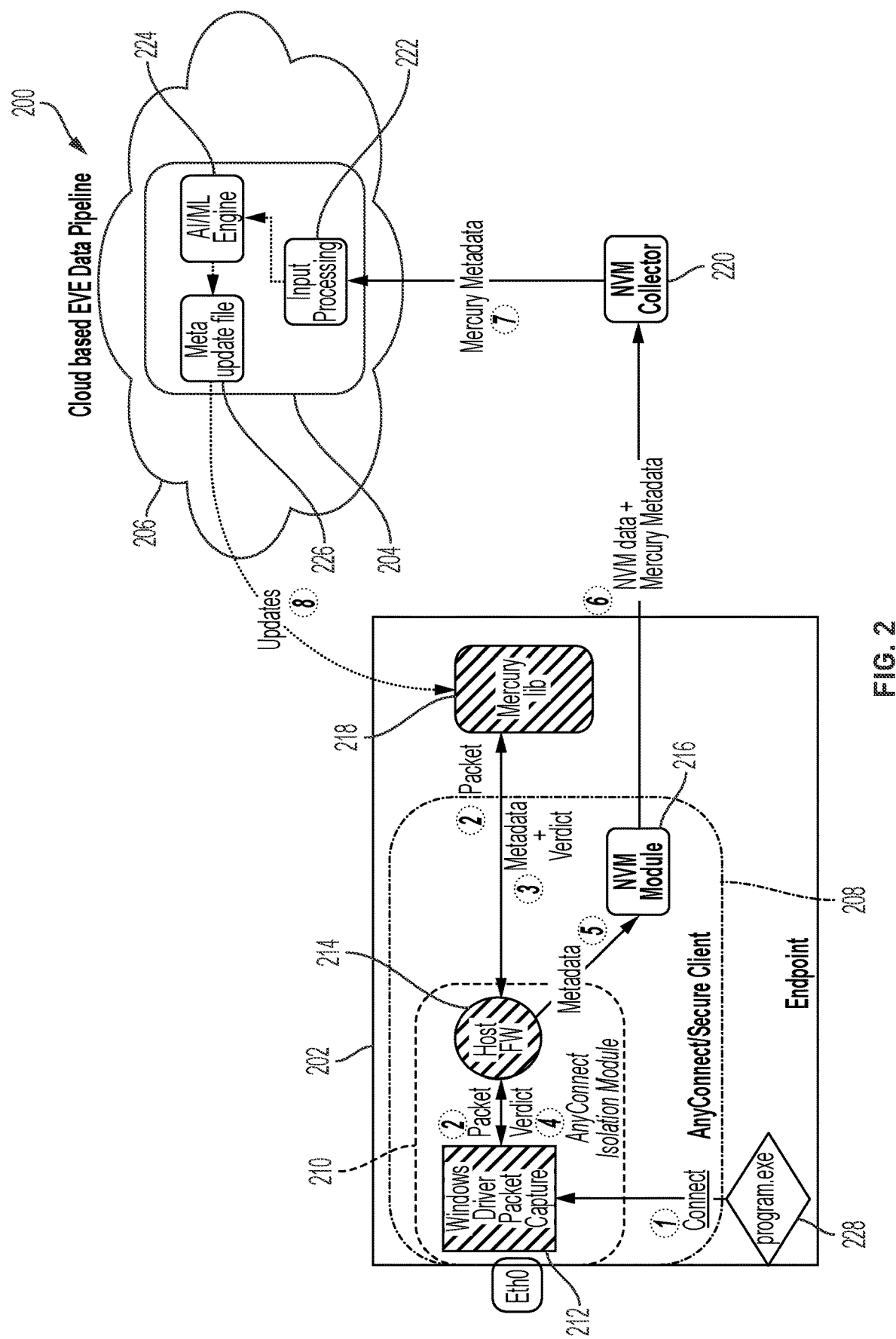
FIG. 2 illustrates an example configuration of an endpoint with embedded secure client agent, on-device firewall and library agent, interconnected with a cloud-based data pipeline, according to some aspects of the present disclosure.

FIG. 2 illustrates an example configuration of an endpoint with embedded secure client agent, on-device firewall and library agent, interconnected with a cloud-based data pipeline, according to some aspects of the present disclosure. Configuration 200 illustrates an example endpoint 202 that is communicatively coupled to a Data pipeline 204 hosted in Cloud 206.

As noted above, endpoint 202 can be any known or to be developed device such as a laptop, a mobile device, a desktop, IoTs, etc., at any one or more of home office network 120, branch office network 122, campus network 124, and/or data center 126 of FIG. 1, connected to a network (e.g., enterprise network architectures 100).

Endpoint 202 may have a connection agent 208 (secure client) installed thereon. A non-limiting example of connection agent 208 is AnyConnect software developed by Cisco Inc., of San Jose, CA.

Connection agent 208 may have an isolation module 210. Isolation module 210 may be configured to perform functions including, but not limited to, packet capturing and, as will be described further, in-line validation of incoming network traffic to determine/detect malwares and/or unauthorized plugin insertions.

Connection agent 208 may include a packet capture driver 212 and a host firewall 214. As will be described below, packet capture driver 212 is configured to detect (intercept or capture) incoming and/or outgoing network traffic packets received at endpoint 202 (and more particularly at connection agent 208). These packets may then be passed onto host firewall 214 for receiving a decision as to whether they are associated with authorized network traffic or unauthorized network traffic (e.g., malicious software, browser plugin, etc.).

Host firewall 214 may be communicatively connected to NVM module 216 and library agent 218 (mercury library). Interconnection of these components and their functionality will be described below.

Configuration 200 further shows an NVM collector 220 communicatively coupled to NVM module 216. NVM collector 220 in turn may be communicatively coupled to data pipeline 204. Data pipeline 204 may include, among other know or to be developed components, an input processor 222, an ML engine 224, and meta update file 226. As will be described below, metadata on incoming packets may be captured by NVM module 216, which together with metadata from library agent 218 may be passed onto NVM collector 220. In one example, the metadata can also include previously generated fingerprints by library agent 218. NVM collector 220 may pass this information to data pipeline 204. Data pipeline 204 may, through use of machine learning techniques deployed by ML engine 224, provide assessment on existing and/or never-seen-before data packets and hence a validation decision thereon. This assessment may then be passed on to library agent 218 via meta update file 226, which library agent 218 may use to provide a fingerprint (an assessment) on whether captured data packets are valid/authorized or otherwise are indicative of malicious software, browser plugins, etc.

FIG. 2 illustrates a process flow (identified as (1)-(8)). This non-limiting process flow shows how packets may be analyzed in-line to provide instant and real-time assessment/detection of malicious software, malware, unauthorized plugins, etc.

As shown, at (1), network traffic 228 (e.g., program.exe) may be received at endpoint 202 and more specifically at connection agent 208. Data packets associated with network traffic 228 may then be captured by packet capture driver 212 and passed on to host firewall 214 in order for host firewall 214 to determine whether to block and/or allow the packets to be passed on to their next destination, at (2). In some examples, not every data packet is passed on to host firewall 214 and only a subset of the data packets may be passed on. The number of data packets to be passed on may be determined based on experiments and/or empirical studies, and is a configurable parameter.

Still at (2), the data packets received at host firewall 214 are passed on to library agent 218 (e.g., mercury library) to be examined/assessed. The result of this assessment, as will be described further below, may be a fingerprint for the data packets that can indicate whether the data packets are authorized/verified or otherwise are suspicious, belong to an unauthorized malware, software plugins, etc. The fingerprint may then be used by host firewall 214 to block or allow the data packets to pass through to their next destination in the network.

After process the data packets received at (2), at (3), library agent 218 provides a verdict (e.g., a fingerprint) for the data packets. In one example, the received data packets may be associated with a process, a traffic source, and/or otherwise previously received/observed network traffic that library agent 218 has previously determined to be authorized or malicious. Given this prior determination associated with the network traffic, library agent 218 issues a fingerprint/verdict on authenticity of the data packets, which may then be passed back to host firewall 214 along with metadata of the data packets.

At (4), the verdict may be used by host firewall 214 to determine whether to drop the network traffic or allow it to pass on. For instance, if the verdict (fingerprint) indicates that the data packets are associated with a malware, host firewall 214 drops network traffic 228. However, if the fingerprint indicates that the data packets are associated with authorized network traffic 228, then host firewall 214 may allow the data packets to pass through endpoint 202 to their next destination.

Concurrent with or after making a determination as to whether to drop or permit the data packets to pass through at (4), host firewall 214 may, at step (5) pass metadata of the data packets (received from library agent 218) to NVM module 216. NVM module 216 may be any known or to be developed module configured to collect rich flow context from endpoint 202 on or off premise and provides visibility into network connected devices, user behaviors, processes running on endpoint 202, etc.

Metadata (provided by library agent 218) received at (4) and NVM data (data collected by NVM module 216 per known techniques) may then be sent to NVM collector 220 (which may reside at any point in the network) at (6).

Metadata related to the data packets (mercury metadata) may then be passed to data pipeline 204 at (7). This data may be used by data pipeline 204 to train, update and/or optimize a machine learning model that can be used by library agent 218 to determine authenticity of data packets and consequently the fingerprint to be provided for data packets under examination by library agent 218.

Machine learning model (e.g., ML engine 224) may be trained to receive metadata (mercury metadata) as input and provide as output an indication as to whether or not the associated data packets correspond to a malware, unauthorized browser plugins, etc., or otherwise correspond to authorized traffic, data packets of which should not be blocked and permitted to pass through to the next destination in the network.

Outputs and classification by ML engine 224 may be recorded in meta update file 226 and in real-time or periodically be sent to library agent 218 at (8), which library agent 218 may use in determining a fingerprint for one or more data packets received by library agent 218 at (2).

Figure 3:
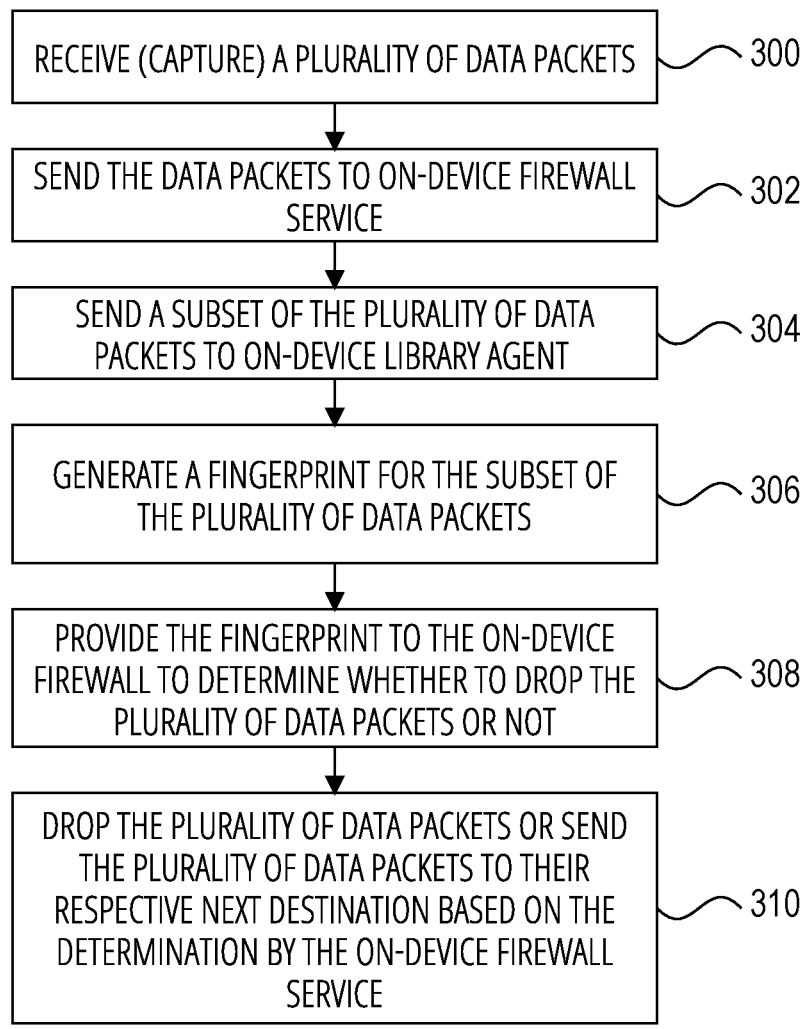
FIG. 3 is a flowchart of an example process for in-line packet inspection and malware detection according to some aspects of the present disclosure.

FIG. 3 is a flowchart of an example process for in-line packet inspection and malware detection according to some aspects of the present disclosure. Example process of FIG. 3 will be described from the perspective of endpoint 202 connected to a network such as network architecture 100 (enterprise network) of FIG. 1.

At block 300, endpoint 202 may receive a plurality of data packets. The plurality of data packets may be originating from endpoint 202 (e.g., such as one or more processes initiating on endpoint 202) or may be external network traffic received at endpoint 202 (e.g., network traffic from other components in enterprise network 100 to which endpoint 202 is connected, from the wider Internet, etc. The plurality of data packets may be received at connection agent 208. As described above, packet capture driver 212 on endpoint 202 may intercept the plurality of data packets.

At block 302, the plurality of data packets (e.g., one or more of the plurality of data packets) may be provided by packet capture driver 212 to host firewall 214 on endpoint 202 (on-device host firewall service) for host firewall 214 to determine whether the plurality of data packets should be blocked (dropped) or be permitted to pass through to next destination (e.g., on the internet, within network architecture 100, etc.).

At block 304, host firewall 214 on endpoint 202 may pass (send) a subset of the plurality of data packets (e.g., first two, three, four, five data packets) to library agent 218 on endpoint 202. In one example, the number of data packets included in the subset may be a configurable parameter that can change from time to time. In another example, the packets included in the subset may not be the first few data packets but may be randomly selected from among the plurality of data packets.

At block 306, library agent 218 on endpoint 202 may generate a fingerprint for the subset of the plurality of packets. As described above, the fingerprint may be indicative of whether the plurality of data packets are associated with an external malware communication, an unauthorized plugin (e.g., a browser plugin) or otherwise are associated with authorized network traffic source such that they should not be dropped and hence be allowed to pass through to their relevant next destination.

In one example, library agent 218 may have access to a log of previously inspected data packets and associated metadata to determine their validity/authentication. This log may be periodically updated via meta update file 226. As described with reference to FIG. 2, meta update file 226 may be updated from time to time based on output of ML engine 224, which can be any type of known or to be developed machine learning model. ML engine 224 may be trained to receive as input metadata associated with packets inspected by library agent 218 and passed on to NVM module 216, as described above, and provide an assessment as to whether such metadata are indicative of data packets associated with such metadata are authorized or unauthorized (e.g., malware).

Therefore, at block 306, library agent 218, using a log (a malware detection database) provided by ML engine 224 and via data pipeline 204, can generate a fingerprint (verdict) for the subset of the plurality of data packets. The fingerprint may have any known or to be developed format.

At block 308, the generated fingerprint may be provided by library agent 218 to host firewall 214. In one example, library agent 218 may pass to host firewall 214, metadata associated with the fingerprint. Metadata may include any information about the inspected subset of the plurality of data packets such as timestamp, source and destination IP addresses, encapsulation data, etc.

At block 310, host firewall 214, using the fingerprint received at block 308, may determine whether to block (drop) the plurality of packets received at block 300 or allow the plurality of data packets to proceed (pass through) to their next destination. For example, if the fingerprint indicates that the subset of the data packets are associated with a malware, unauthorized plugin, etc., the at block 310, host firewall 214 drops the plurality of data packets received at block 300. Otherwise, host firewall 214 allows the plurality of data packets received at block 300 to be transmitted/pass through endpoint 202 to their next designated destination.

Thereafter, connection agent 208 of endpoint 202 either drops the plurality of data packets or permits (sends) the plurality of data packets to their respective next destination based on the determination by host firewall 214 at block 310.

On advantageous aspect of in-line inspection of data packets on an endpoint, as described above, is that encrypted data packets that are either outgoing from endpoint 202 or are incoming at endpoint 202 need not be decrypted, which is typically what happens when packets are sent to external or remote firewall services for inspection. Furthermore, this in-line inspection can be performed fast (e.g., through analysis of only a subset of the underlying data packets) and in rea-time. It improves security (Network Detection and Response (NDR), Endpoint Detection and Response (EDR), and/or Extended Detection and Response (XDR)) at endpoints connected to a network and provides better monitoring and control over network traffic at the endpoints. Given that data packets are inspect on endpoint 202, signaling overhead associated with packet decryption, transmission to remote firewall services, etc., may be reduced hence improve network efficiency, speed, and resource consumption. Lastly, the use of ML engine 224 enables on-device generation of fingerprints for never-seen-before data packets that allows for previously unknown malware and unauthorized plugins to be identified and stopped at a point of network entry, thereby improving overall network security.

Figure 4:
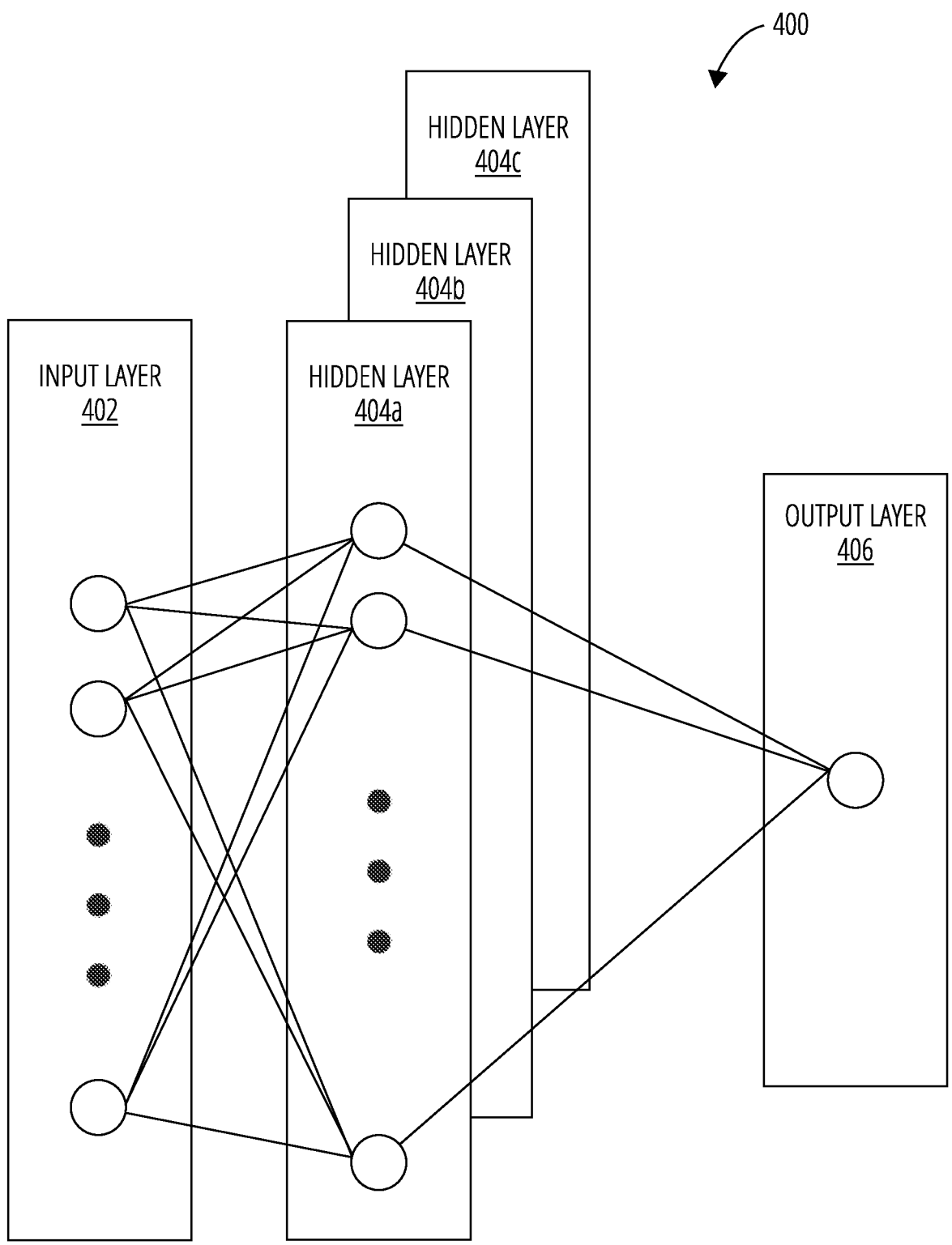
FIG. 4 is an illustrative example of a deep learning neural network model that can be deployed in ML engine of configuration of FIG. 2 according to some aspect of the present disclosure.

The disclosure now turns to a further discussion of neural network models that can be deployed at ML engine 224 for performing inline packet inspection and fingerprinting as described above. Specifically, FIG. 4 is an illustrative example of a deep learning neural network model that can be deployed in ML engine of configuration of FIG. 2 according to some aspect of the present disclosure.

An input layer 402 can be configured to receive input data (e.g., metadata from NVM collector 220, after processing by input processor 222). Neural network 400 can include multiple hidden layers 404a, 404b, through 404c. The hidden layers 404a through 404c include "n" number of hidden layers, where "n" is an integer greater than or equal to one. The number of hidden layers can be made to include as many layers as needed for the given application. The neural network 400 further includes an output layer 406 that provides an output resulting from the processing performed by the hidden layers 404a through 404c. In one illustrative example, the output layer 406 can provide an assessment of (identification of) malwares, unauthorized plugins, etc. In other words, output layer 406 can provide a likelihood that certain types of metadata may be associated with malwares, unauthorized plugins, etc. This likelihood can then be used by library agent 218 to generate a fingerprint for any subset of data packets received thereby from host firewall 214.

The neural network 400 is a multi-layer neural network of interconnected nodes. Each node can represent a piece of information. Information associated with the nodes is shared among the different layers and each layer retains information as information is processed. In some cases, the neural network 400 can include a feed-forward network, in which case there are no feedback connections where outputs of the network are fed back into itself. In some cases, the neural network 400 can include a recurrent neural network, which can have loops that allow information to be carried across nodes while reading in input.

Information can be exchanged between nodes through node-to-node interconnections between the various layers. Nodes of the input layer 402 can activate a set of nodes in the first hidden layer 404a. For example, as shown, each of the input nodes of the input layer 402 is connected to each of the nodes of the first hidden layer 404a. The nodes of the first hidden layer 404a can transform the information of each input node by applying activation functions to the input node information. The information derived from the transformation can then be passed to and can activate the nodes of the next hidden layer 404b, which can perform their own designated functions. Example functions include convolutional, up-sampling, data transformation, and/or any other suitable functions. The output of the hidden layer 404b can then activate nodes of the next hidden layer, and so on. The output of the last hidden layer 404c can activate one or more nodes of the output layer 406, at which an output is provided. In some cases, while nodes in the neural network 400 are shown as having multiple output lines, a node can have a single output and all lines shown as being output from a node represent the same output value.

In some cases, each node or interconnection between nodes can have a weight that is a set of parameters derived from the training of the neural network 400. Once the neural network 400 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 400 to be adaptive to inputs and able to learn as more and more data is processed.

The neural network 400 is pre-trained to process the features from the data in the input layer 402 using the different hidden layers 404a through 404c in order to provide the output through the output layer 406.

In some cases, the neural network 400 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 400 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(½(target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 400 can perform a backward pass by determining which inputs (weights) most contributed to the loss of the network, and can adjust the weights so that the loss decreases and is eventually minimized.

The neural network 400 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 400 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 5:
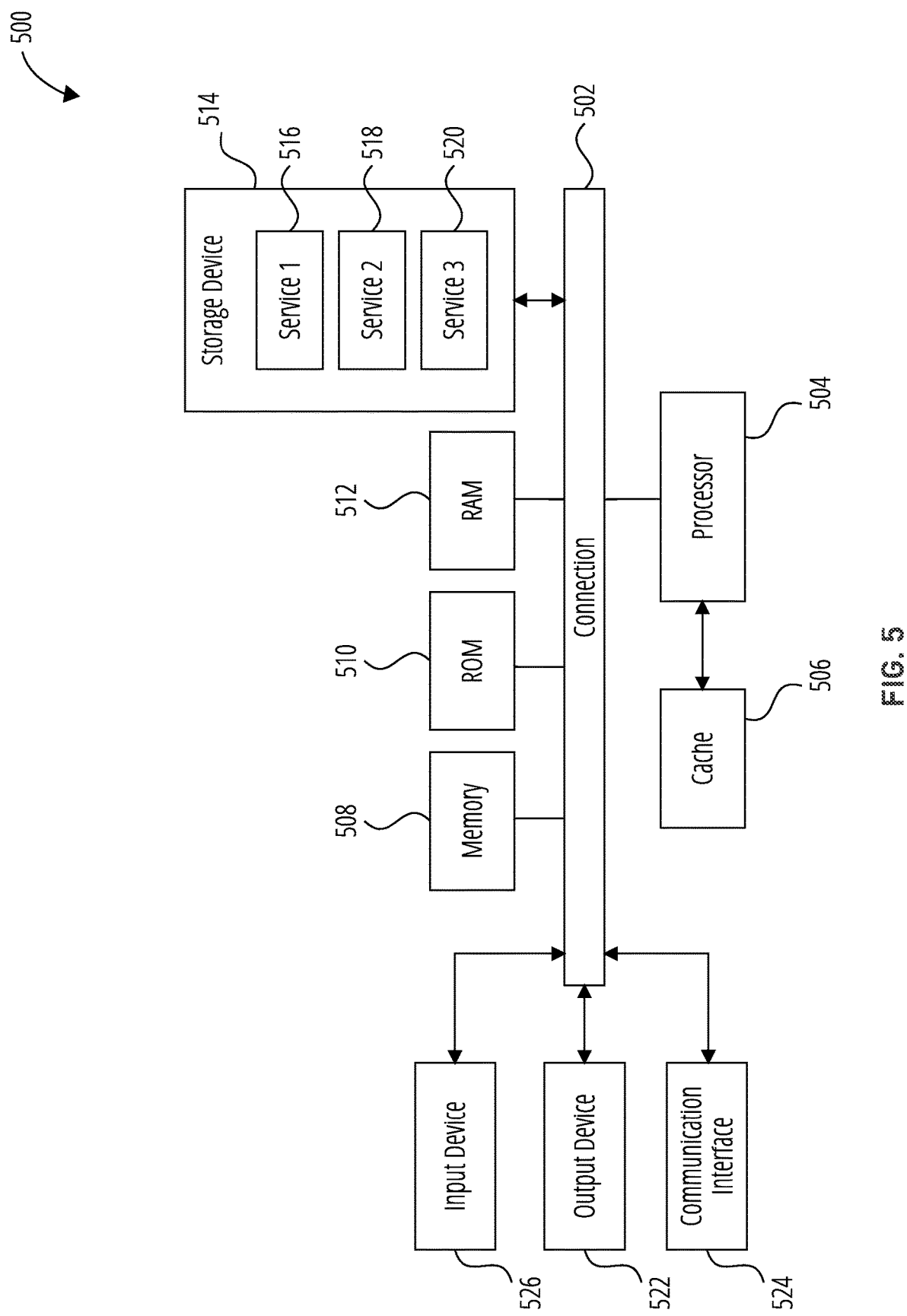
FIG. 5 shows an example of a system according to some aspects of the present disclosure.

FIG. 5 shows an example of a system according to some aspects of the present disclosure. Example computing system 500 can be used as any component of network architecture 100, configuration 200 (e.g., endpoint 202, library agent 218, data pipeline 204, etc.).

Components of computing system 500 can be in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A network device comprising:
    a driver configured to capture a plurality of data packets received at the network device; and
    an on-device malware detection engine configured to:
        receive at least a subset of the plurality of packets, and
        generate a fingerprint for the subset of the plurality of packets, the fingerprint being indicative of whether the plurality of data packets are associated with an external malware communication, wherein
        the network device is a user device that is communicatively coupled to one or more cloud-based services and devices in a network, and
        the fingerprint is generated before the plurality of packets reach the one or more cloud-based services and devices in the network.

2. The network device of claim 1, wherein the on-device malware detection engine is configured to generate the fingerprint inline with reception and processing of the plurality of packets at the network device.

3. The network device of claim 1, further comprising:
    a firewall agent on the network device configured to determine whether to drop the plurality of packets or permit the plurality of packets to pass through, based on the fingerprint.

4. The network device of claim 1, wherein the on-device malware detection engine is configured to generate the fingerprint using a malware detection database.

5. The network device of claim 4, wherein the malware detection database is generated using a machine learning engine.

6. The network device of claim 5, wherein the machine learning engine is cloud-based and is trained using metadata of previously examined data packets for which the on-device malware detection engine has generated fingerprints.

7. The network device of claim 1, further comprising:
    a connection agent configured to provide secure network access to the network device, and
    the driver and the on-device malware detection engine are software modules within the connection agent.

8. The network device of claim 7, wherein the network device is an endpoint terminal connected to a network using the connection agent.

9. One or more non-transitory computer-readable media comprising computer-readable instructions, which when executed by one or more processors of a network device, cause the network device to:
- capture a plurality of data packets received at the network device;
- receive at least a subset of the plurality of packets, and generate a fingerprint for the subset of the plurality of packets, the fingerprint being indicative of whether the plurality of data packets are associated with an external malware communication, wherein
- the network device is a user device that is communicatively coupled to one or more cloud-based services and devices in a network, and
- the fingerprint is generated before the plurality of packets reach the one or more cloud-based services and devices in the network.

10. The one or more non-transitory computer-readable media of claim 9, wherein the network device includes an on-device malware detection engine configured to generate the fingerprint inline with reception and processing of the plurality of packets at the network device.

11. The one or more non-transitory computer-readable media of claim 9, wherein the execution of the computer-readable instructions further cause the network device to determine whether to drop the plurality of packets or permit the plurality of packets to pass through, based on the fingerprint.

12. The one or more non-transitory computer-readable media of claim 9, wherein the fingerprint is generated using a malware detection database.

13. The one or more non-transitory computer-readable media of claim 12, wherein the malware detection database is generated using a machine learning engine.

14. The one or more non-transitory computer-readable media of claim 13, wherein the machine learning engine is cloud-based and is trained using metadata of previously examined data packets for which the on-device malware detection engine has generated fingerprints.

15. The one or more non-transitory computer-readable media of claim 9, wherein the network device comprises:
- a connection agent configured to provide secure network access to the network device, and
- a driver and an on-device malware detection engine as software modules within the connection agent to capture the plurality of data packets and generate the fingerprint.

16. A method for on-device inspection of network traffic, the method comprising:
- capturing a plurality of data packets received at a network device;
- using an on-device malware detection engine,
- processing a subset of the plurality of packets, and
- generating a fingerprint for the subset of the plurality of packets, the fingerprint being indicative of whether the plurality of data packets are associated with an external malware communication, wherein
- the network device is a user device that is communicatively coupled to one or more cloud-based services and devices in a network, and
- the fingerprint is generated before the plurality of packets reach the one or more cloud-based services and devices in the network.

17. The method of claim 16, further comprising:
- determining whether to drop the plurality of packets or permit the plurality of packets to pass through, based on the fingerprint.

18. The method of claim 16, wherein the on-device malware detection engine generates the fingerprint using a malware detection database.

19. The method of claim 18, wherein the malware detection database is generated using a machine learning engine.

20. The method of claim 19, wherein the machine learning engine is cloud-based and is trained using metadata of previously examined data packets for which the on-device malware detection engine has generated fingerprints.

* * * * *